United States Patent
Gibbons

(10) Patent No.: US 8,314,814 B2
(45) Date of Patent: Nov. 20, 2012

(54) IMAGING SYSTEM

(75) Inventor: Robert C. Gibbons, Richardson, TX (US)

(73) Assignee: Raytheon Company, Waltham, MA (US)

(*) Notice: Subject to any disclaimer, the term of this patent is extended or adjusted under 35 U.S.C. 154(b) by 701 days.

(21) Appl. No.: 12/338,624

(22) Filed: Dec. 18, 2008

(65) Prior Publication Data

US 2009/0160872 A1  Jun. 25, 2009

Related U.S. Application Data

(60) Provisional application No. 61/015,556, filed on Dec. 20, 2007.

(51) Int. Cl.
*G09G 5/00* (2006.01)
*G09G 5/391* (2006.01)

(52) U.S. Cl. ............ 345/619; 345/8; 345/9; 345/33; 345/428; 345/581; 345/627; 345/628; 385/116; 385/120

(58) Field of Classification Search .......... 345/8, 76, 345/428, 581, 619, 627, 628; 348/E5.145; 385/116, 120
See application file for complete search history.

(56) References Cited

U.S. PATENT DOCUMENTS

| | | | | |
|---|---|---|---|---|
| 4,911,528 A * | 3/1990 | Polaert | ............. | 385/116 |
| 5,748,264 A * | 5/1998 | Hegg | ............. | 348/746 |
| 6,115,007 A | 9/2000 | Yamazaki | ............. | 345/7 |
| 6,222,675 B1 | 4/2001 | Mall et al. | ............. | 359/630 |
| 6,636,185 B1 | 10/2003 | Spitzer et al. | ............. | 345/8 |
| 7,374,284 B2 | 5/2008 | Peli | ............. | 351/175 |
| 7,475,356 B2 | 1/2009 | Baudisch et al. | ............. | 715/761 |
| 7,495,638 B2 | 2/2009 | Lamvik et al. | ............. | 345/76 |
| 2002/0057279 A1* | 5/2002 | Jouppi | ............. | 345/619 |
| 2002/0167531 A1 | 11/2002 | Baudisch | ............. | 345/611 |
| 2003/0151563 A1* | 8/2003 | Kulas | ............. | 345/7 |
| 2004/0227703 A1 | 11/2004 | Lamvik et al. | | |
| 2005/0195373 A1* | 9/2005 | Feigel et al. | ............. | 353/94 |
| 2006/0176951 A1 | 8/2006 | Berman | | |

FOREIGN PATENT DOCUMENTS

| | | |
|---|---|---|
| JP | S61-169880 | 2/1988 |
| JP | 2000-241791 | 9/2000 |
| JP | 2001-197348 | 7/2001 |
| JP | 2006-267503 | 10/2006 |
| JP | 2006267503 | 10/2006 |

OTHER PUBLICATIONS

Communication/Extended European Search Report for application No. EP 08 17 2472.6-2002; (7 pages), Apr. 20, 2009.

* cited by examiner

*Primary Examiner* — Xiao M. Wu
*Assistant Examiner* — Todd Buttram
(74) *Attorney, Agent, or Firm* — Thorpe North & Western LLP

(57) ABSTRACT

According to one embodiment, an imaging system includes a processing system and a display generator. The processing system is operable to process a signal received from a camera to yield foveal data for a foveal display region and outer data for an outer display region. The outer data have a reduced pixel density with respect to the pixel density of the foveal data. The display generator is operable to generate the foveal display region from the foveal data according to a 1:n mapping ratio, and generate the outer display region from the outer data according to a 1:m mapping ratio, where m is greater than n.

20 Claims, 4 Drawing Sheets

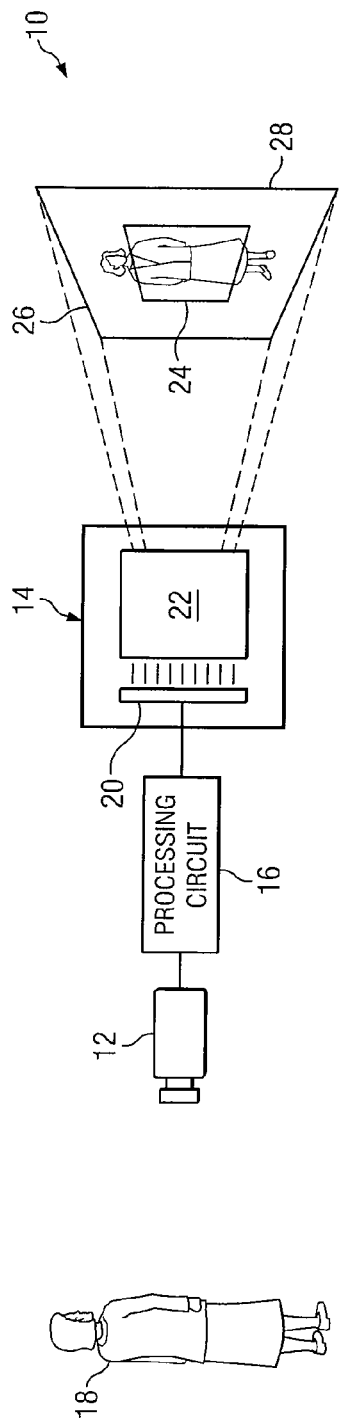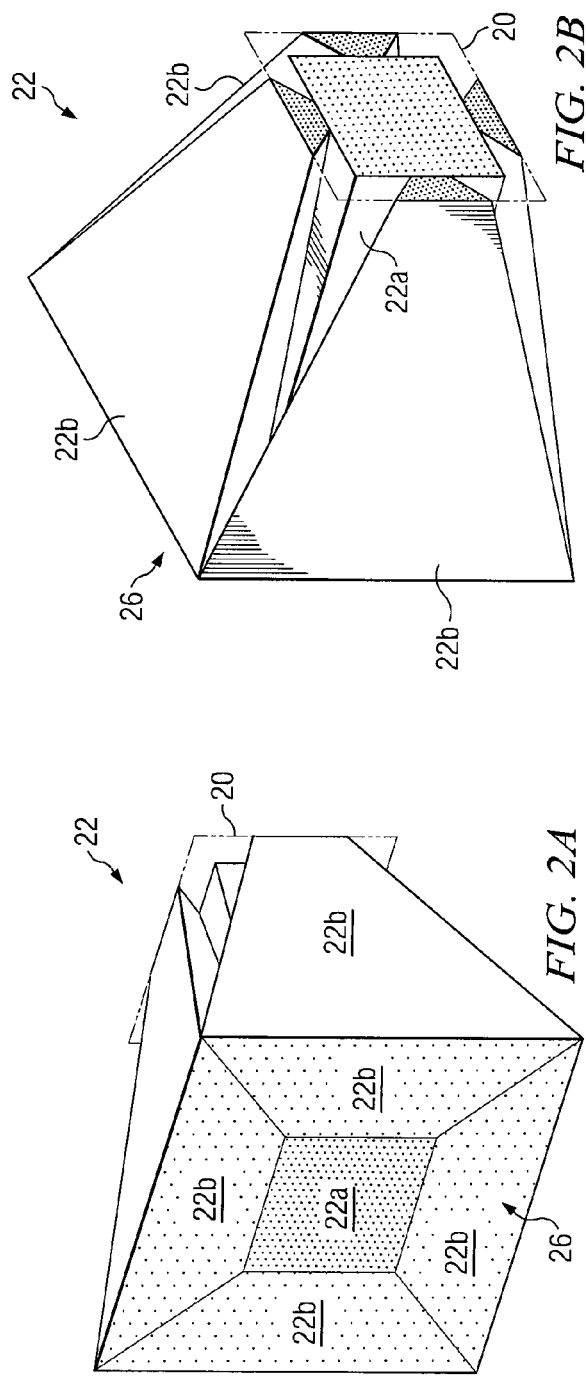

IMAGING SYSTEM

RELATED APPLICATIONS

This application claims priority to U.S. Provisional Patent Application Ser. No. 61/015,556, entitled "IMAGING SYSTEM," which was filed on Dec. 20, 2007.

TECHNICAL FIELD OF THE DISCLOSURE

This disclosure generally relates to imaging systems, and more particularly, to an imaging system operable to generate an image with multiple display regions.

BACKGROUND OF THE DISCLOSURE

Visual displays typically include a number of lighting elements that form pixels of an image. The lighting elements may be arranged in a N number of rows by a M number of columns to form an N*M image. Common types of visual displays may include cathode ray tubes (CRTs) or liquid crystal displays (LCDs).

SUMMARY OF THE DISCLOSURE

According to one embodiment, an imaging system includes a processing system and a display generator. The processing system is operable to process a signal received from a camera to yield foveal data for a foveal display region and outer data for an outer display region. The outer data have a reduced pixel density with respect to the pixel density of the foveal data. The display generator is operable to generate the foveal display region from the foveal data according to a 1:n mapping ratio, and generate the outer display region from the outer data according to a 1:m mapping ratio, where m is greater than n.

Certain embodiments of the disclosure may provide advantages. Certain embodiments may more efficiently use image data by providing a foveal display region with a higher pixel density and an outer display region with a lower pixel density. The efficient use of image data may allow for increased compression of data. Certain embodiments may provide greater resolution at the foveal display region and greater field-of-view at the outer display region.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which:

FIG. 1 is a diagram showing one embodiment of an imaging system according to the teachings of the present disclosure;

FIGS. 2A and 2B are front and rear perspective views, respectively, of a fiber optic coupler that may be used with the imaging system of FIG. 1;

DETAILED DESCRIPTION OF EXAMPLE EMBODIMENTS

Figure 3A:
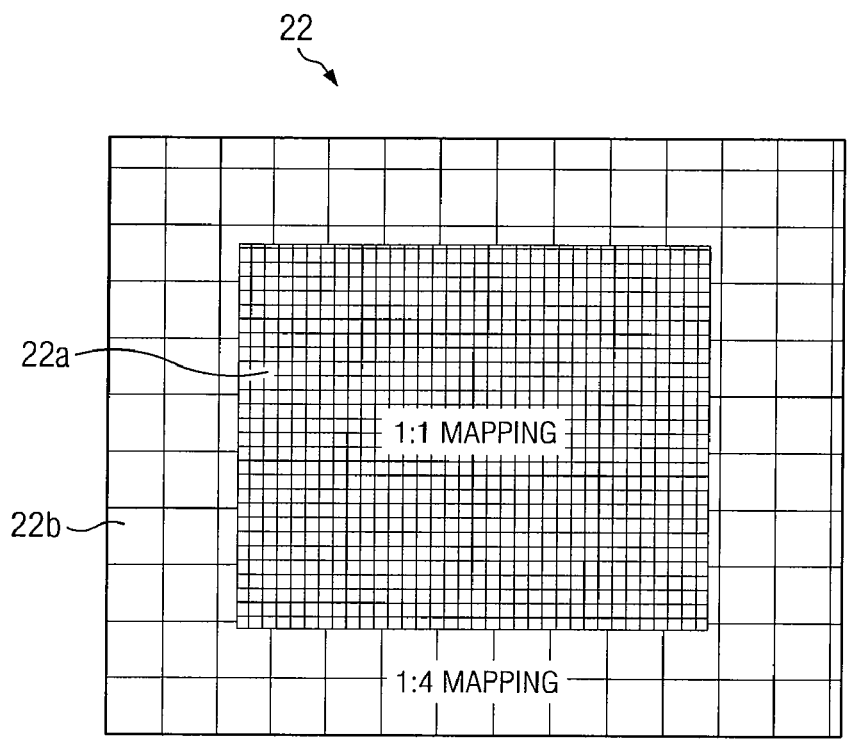
FIGS. 3A and 3B are front and side elevational views, respectively, of the fiber optic coupler of FIGS. 2A and 2B.

Imaging systems may comprise visual displays that display images generated from signal received from video cameras. These imaging systems may provide various benefits over view by the naked eye. For example, imaging systems, such as surveillance systems, may provide images of remote locations. As another example, imaging systems may receive signals from infrared cameras to generate images of dark environments.

Visual displays may include multiple lighting elements that form pixels of an image. The quality of the image produced by the visual display may be proportional to the pixel density of the image. Pixel density generally refers to the quantity of pixels of an image per the area of the image. Visual displays may be limited, however, in the density of lighting elements that generate the pixilated image. Thus, providing uniform pixel density across a full field of view may difficult to achieve.

FIG. 1 shows one embodiment of an imaging system 10 according to the teachings of the present disclosure. Imaging system 10 includes a camera 12 coupled to a display generator 14 through a processing circuit 16 as shown. Camera 12 is operable to generate an electrical signal that represents light reflected or emitted from an object 18. Processing circuit 16 is operable to process the electrical signal for use by display generator 14. Display generator 14 is operable generate an image 28 from the processed signal received from processing circuit 16. Image 28 includes foveal display region 24 and outer display region 26.

Certain embodiments of imaging system 10 may provide advantages. Certain embodiments may more efficiently use image data by providing a foveal display region 24 with a higher pixel density and an outer display region 26 with a lower pixel density. Certain embodiments may provide greater resolution at foveal display region 24 and greater field-of-view at outer display region 26.

Processing circuit 16 may be any suitable device that processes the electrical signal from one or more cameras 12 into a form suitable for use by display generator 14. In one embodiment, processing circuit 16 comprises a processor executing instructions stored in a memory. Memory may include any one or combination of volatile memory elements, such as random access memory (RAM), dynamic random access memory (DRAM), static random access memory (SRAM), and nonvolatile memory elements, such as read only memory (ROM), erasable programmable read only memory (EPROM), electronically erasable programmable read only memory (EEPROM), programmable read only memory (PROM), tape, compact disc read only memory (CD-ROM), disk, diskette, cartridge, or the like. Processing circuit 16 processes electrical signals received from camera 12 to yield image 28 that includes foveal display region 24 and outer display region 26.

In one embodiment, processing circuit 16 is coupled to multiple cameras 12 that detect light from object 18 at various field-of-views that may be used to process foveal display region 24 and outer display region 26. In another embodiment, processing circuit 16 is coupled to a single camera 12 with multiple apertures that detect light from object 18 at multiple field-of-views. In another embodiment, processing circuit 16 processes signals from a single camera 12 to reduce the pixel density at outer display region 26 relative to foveal display region 24.

Display generator 14 may be any device that generates image 28 having a foveal display region 24 and an outer display region 26. In the particular embodiment shown, display generator 14 includes a spatial light generator 20 optically coupled to a fiber optic coupler 22. Spatial light generator 20 may be any suitable device that generates light that form pixels according to the electrical signal provided by camera 12. In one embodiment, spatial light generator 20 includes a cathode ray tube (CRT) or a liquid crystal display (LCD). In another embodiment, spatial light generator 20 includes a light source and a light modulating device, such as a digital micro-mirror device (DMD), that modulates light from the light source.

Fiber optic coupler 22 is operable to form a foveal display region 24 and an outer display region 26. Fiber optic coupler 22 is described in more detail with reference to FIGS. 2A and 2B.

Image 28 may be formed on any suitable two-dimensional or three-dimensional surface. In the particular embodiment shown, image 28 is projected onto an external surface. In other embodiments, image 28 may be viewed from a two-dimensional surface of fiber optic coupler 22.

Display generator 14 may be used with any suitable imaging platform. For example, an imaging platform may be a head-mounted display, such as a helmet, that maintains display generator 14 in a fixed position in front of the user's eyes. Display generator 14 configured on a head-mounted display may maintain foveal display region 24 in alignment with the foveal portion of the user's eyes. As another example, an imaging platform may be a surveillance system in which foveal display region 24 may be used to enhance visual quality of a specified portion of object 18, while maintaining a relatively wide field-of-view.

The fovea of the human eye detects visual information with greater precision than other portions of the eye. The fovea yields a foveal portion of the eye's field-of-view that is more precise. In most cases, the foveal portion is centrally located within the field-of-view. The foveal display region 24 of the image 28 may provide more visual information for the fovea. Outer display region 26 displays peripheral information around the foveal display region 24 with less visual information.

Image 28 may have a field-of-view based upon its distance from the eyes of the user. In a particular embodiment in which display generator 14 is configured on a head-mounted display, image 28 may have a field-of-view of approximately 45 degrees in width by 36 degrees in height relative to the eyes of the user. In other embodiments, the field-of-view of image 28 may have any suitable dimensions, such as a width of less than 30, 30 to 60 degrees, or greater than 60 degrees and a height of less than 20, 20 to 50 degrees, or greater than 50 degrees. The field-of-view may have an aspect ratio suitable for viewing image 28.

Foveal display region 24 may form any portion of image 28. In the particular embodiment in which display generator 14 is configured on a head-mounted display, foveal display region 24 may comprise 18 degrees (width) by 14.4 degrees (height) of the field-of-view with the outer display region 26 comprising 45 degrees (width) by 36 degrees (height) field-of-view relative to the eyes of the user. Thus, foveal display region 24 may be approximately 40 percent of the field-of-view of outer display region 26. In other embodiments, foveal display region 24 may form any portion of image 28 that may range from less than 30 percent, 30 percent to 50 percent, or greater than 50 percent of the viewing area of image 28.

The number of pixels of image 28 may be represented by the following equation:

$$D_{pix} = \frac{\theta_1}{\alpha} + \frac{(\theta_T - \theta_1)}{M \cdot \alpha}$$

where:
$D_{pix}$=number of pixels in the image;
$\theta_1$=angular size of the foveal display region;
$\theta_T$=angular size of the total field of view;
$\alpha$=angular resolution of the foveal display region; and
M=magnification between foveal display region and the outer field-of-view.

FIGS. 2A and 2B show a front perspective view and a rear perspective view, respectively, of one embodiment of fiber optic coupler 22. Fiber optic coupler 22 includes a section of first lighting elements 22a that transmit light generated by spatial light generator 20 to form foveal display region 24. Fiber optic coupler 22 includes four sections of second lighting elements 22b that transmit light generated by spatial light generator 20 to form outer display region 26 having four sub-regions that are contiguous with foveal display region 24. In other embodiments, outer display region 26 may have any quantity and shape of sub-regions that are contiguous with foveal display region 24.

In this particular embodiment, lighting elements 22a have generally constant cross-sections. The cross-sections of second lighting elements 22b expand as lighting elements 22b extend from spatial light generator 20 to outer display region 26. In this manner, the density of pixels of foveal display region 24 may be greater than the density of pixels of outer display region 26.

If display generator 14 has a width of 1280 pixels, then the fiber optic coupler 22 may magnify the outer display region 26 at approximately 3.9:1 magnification. Accordingly, the angular resolution of pixels of second lighting elements 22b is M·α, or 1.33 milli-radians (mRad), yielding outer display region 26 with a pixel density of approximately 1.33 milli-radians. Given these criteria, foveal display region 24 may have 18 degrees/0.34 milli-radians or 924 pixels, and outer display region 26 may have 27 degrees/1.33 milli-radians or 356 pixels. Thus, the total pixels provided by spatial light generator 20 may be $D_{pix}$=1280. In other embodiments, outer display region 26 may have any suitable magnification relative to foveal display region 24, such as less than 2:1, 2:1 to 6:1, or greater than 6:1. In other embodiments, display generator 14 may have any suitable combination of pixel densities, such as a pixel density of foveal display region 24 of less than 0.20 milli-radians, 0.20 to 0.50 milli-radians, or greater than 0.50 milli-radians and a pixel density of outer display region 26 pixel density of less than 1.0 milli-radians, 1.0 to 1.6 milli-radians, or greater than 1.6 milli-radians.

Figure 3B:
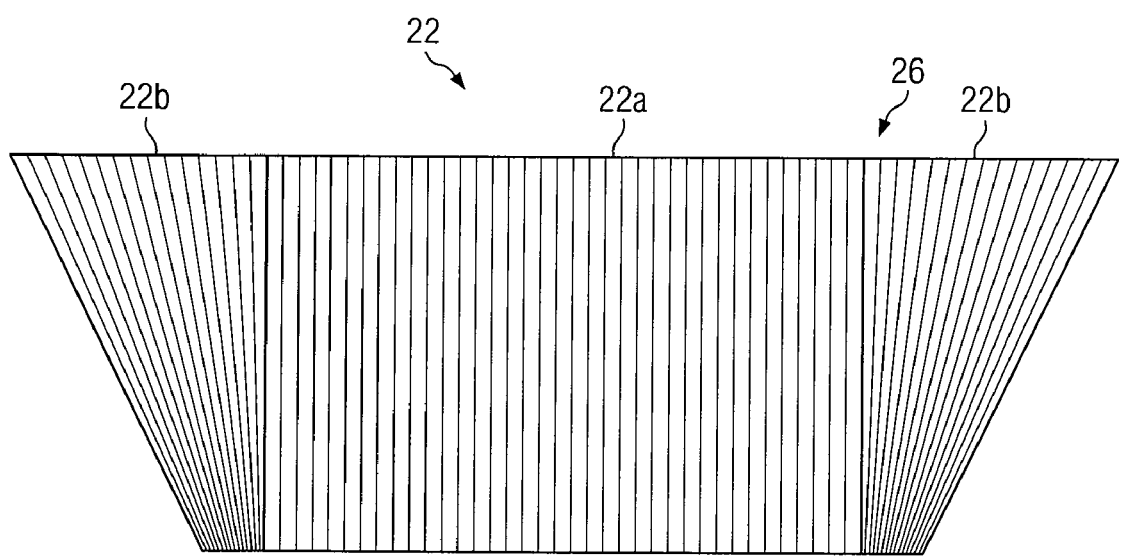

FIGS. 3A and 3B show front and side views, respectively, of fiber optic coupler 22 of FIGS. 2A and 2B. In certain embodiments, the cross-section of a lighting element from an input end to an output end may affect the size of the resulting pixel. For example, an expanding cross-section may yield a larger pixel, and a constant cross-section may yield a pixel of the same size. The effect that a light element has on the size of the resulting pixel may be described as a mapping ratio of 1:x, where 1 represents the input light and x represents the output light.

In the illustrated embodiment, first lighting elements 22a may have a 1-to-n mapping ratio, and second lighting elements 22b may have a 1-to-m mapping ratio, where m>n. Parameters m and n may have any suitable values. For example, m may be approximately 1, 1 to 4, or 4 or greater, and n may be approximately 1, 1 to 2, or 2 or greater. In certain examples, m=4, and n=1.

Figure 4:
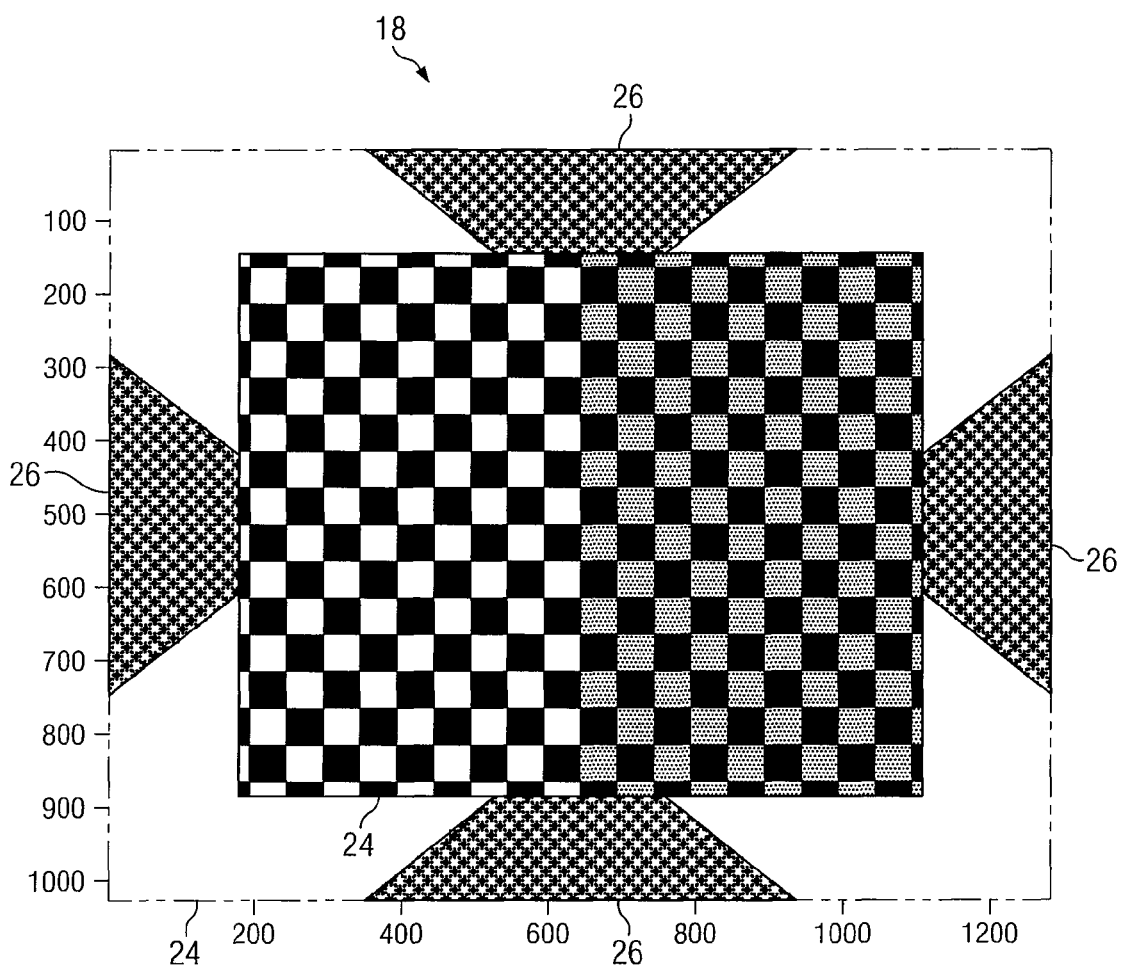
FIG. 4 shows one example of image data that may be processed by the imaging system of FIG. 1.
Figure 5:
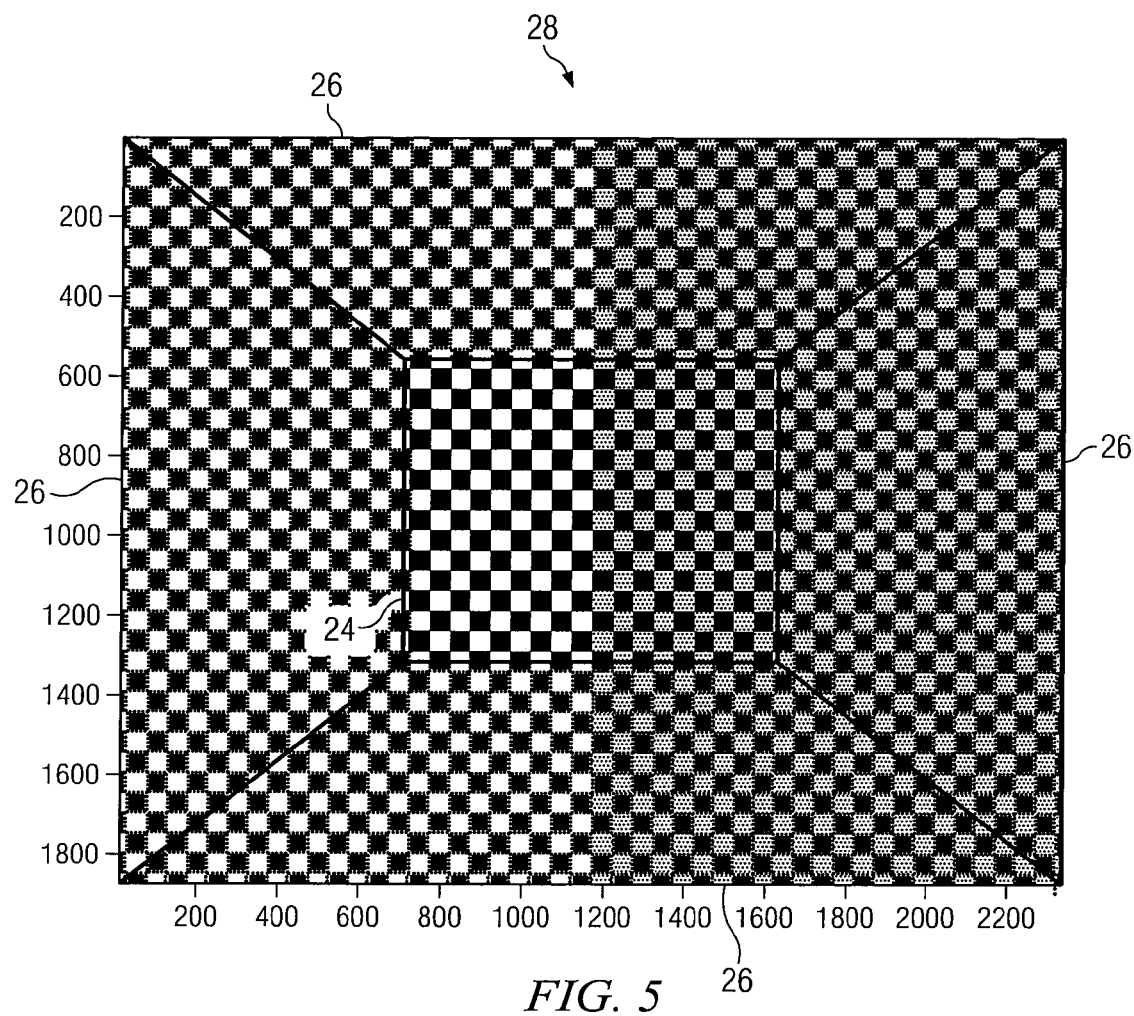
FIG. 5 shows one example of an image of the object of FIG. 4 that may be generated by the imaging system of FIG. 1.

FIG. 4 shows example image data 118, and FIG. 5 shows image 28 that may be generated from image data 118. In the example, image data 118 represents a checkerboard pattern and includes foveal data 124 and outer data 126. Foveal data 124 is used to generate foveal display region 24 of image 28, and outer data 126 is used to generate outer display region 26 of image 28. Accordingly, foveal data 124 yields a pixel density that is less than the pixel density yielded by outer data 126. In certain embodiments, processing system 16 may process foveal data 124 and outer data 126 to yield the differing pixel densities. In certain embodiments, lighting elements 22b increase the relative size of outer display region 26 relative to foveal display region 24.

Modifications, additions, or omissions may be made to imaging system 10 without departing from the scope of the disclosure. The components of imaging system 10 may be integrated or separated. For example, the operations of processing circuit 16 may be integrated with camera 12. Moreover, the operations of imaging system 10 may be performed by more, fewer, or other components. For example, spatial light generator 20 may have an integral foveal display region 24 and outer display region 26 such that an independent fiber optic coupler 22 is not necessary. Additionally, operations of processing circuit 16 may be performed using any suitable logic comprising software, hardware, and/or other logic. As used in this document, "each" refers to each member of a set or each member of a subset of a set.

Certain embodiments of the disclosure may provide advantages. Certain embodiments may more efficiently use image data by providing a foveal display region with a higher pixel density and an outer display region with a lower pixel density. The efficient use of image data may allow for increased compression of data. Certain embodiments may provide greater resolution at the foveal display region and greater field-of-view at the outer display region.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:
1. An imaging system comprising:
an image processing system operable to:
process a plurality of signals received from a corresponding plurality of cameras to yield foveal data for a foveal display region of an image and outer data for an outer display region of the image, the outer display region substantially surrounding the foveal display region, an outer pixel density of the outer data less than the foveal pixel density of the foveal data; and
a display generator comprising a fiber optic coupler operable to transmit light at multiple resolutions simultaneously, the fiber optic coupler comprising a plurality of first lighting elements operable to transmit light according to a 1:n mapping ratio and a plurality of second lighting elements having expanding cross-sections operable to transmit light according to a 1:m mapping ratio, the display generator operable to:
generate, using the plurality of first lighting elements, the foveal display region from the foveal data according to the 1:n mapping ratio; and
generate, using the plurality of second lighting elements, the outer display region from the outer data according to the 1:m mapping ratio, where m is greater than n by a magnification factor in the range of 2:1 to 6:1,
wherein the number of pixels of the image is represented by the equation

$$D_{pix} = \frac{\theta_1}{\alpha} + \frac{(\theta_r - \theta_1)}{M \cdot \alpha}$$

where $\theta_1$ equals an angular size of the foveal display region, $\theta_r$ equals an angular size of a total field of view, a equals an angular resolution of the foveal display region, and M equals a magnification between the foveal display region and the outer display region.

2. An imaging system comprising:
an image processing system operable to:
process one or more signals received from a corresponding one or more cameras to yield foveal data for a foveal display region of an image and outer data for an outer display region of the image, an outer pixel density of the outer data less than the foveal pixel density of the foveal data; and
a display generator comprising a fiber optic coupler operable to transmit light at multiple resolutions simultaneously, the fiber optic coupler comprising a plurality of first lighting elements operable to transmit light according to a 1:n mapping ratio and a plurality of second lighting elements having expanding cross-sections operable to transmit light according to a 1:m mapping ratio, the display generator operable to:
generate the foveal display region from the foveal data according to the 1:n mapping ratio; and
generate the outer display region from the outer data according to the 1:m mapping ratio, where m is greater than n,
wherein the number of pixels of the image is represented by the equation $$D_{pix} = \frac{\theta_1}{\alpha} + \frac{(\theta_r - \theta_1)}{M \cdot \alpha}$$

where $\theta_1$ equals an angular size of the foveal display region, $\theta_r$ equals an angular size of a total field of view, a equals an angular resolution of the foveal display region, and M equals a magnification between the foveal display region and the outer display region.

3. The imaging system of claim 2, the outer display region substantially surrounding the foveal display region.

4. The imaging system of claim 2, the foveal display region has four sides, the outer display region comprising four sub-regions, each sub-region contiguous with a side of the four sides.

5. The imaging system of claim 2, the display generator configured on a head-mounted display operable to be worn by a user, the head-mounted display operable to maintain the image at a substantially fixed position relative to at least one of the eyes of the user.

6. The imaging system of claim 5, the foveal display region and the outer display region having a horizontal field-of-view in the range of 30 degrees to 60 degrees and a vertical field-of-view in the range of 20 degrees to 50 degrees relative to the user.

7. The imaging system of claim 2, wherein m is greater than n by a magnification factor in the range of 2:1 to 6:1.

8. The imaging system of claim 2, the foveal display region having a field-of-view that is in the range of 30 percent to 50 percent of the field-of-view of the outer display region.

9. The imaging system of claim 2:
the one or more cameras comprising a plurality of cameras; and
the one or more signals comprising a plurality of signals from the plurality of cameras; and
the image processing system is operable to:
process a first subset of the signals to yield the foveal data; and
process a second subset of the signals to yield the outer data.

10. The imaging system of claim 2:
the one or more cameras comprising a camera;
the one or more signals comprising a signal from the camera; and
the image processing system is operable to process the signal to yield the foveal data and the outer data.

11. An imaging method comprising:
processing one or more signals received from a corresponding one or more cameras to yield foveal data for a foveal display region of an image and outer data for an outer display region of the image, an outer pixel density of the outer data less than a foveal pixel density of the foveal data;
transmitting, through a fiber optic coupler, light according to a 1:n mapping ratio;
transmitting, through the fiber optic coupler, light according to a 1:m mapping ratio simultaneously with the transmitted light according to the 1:n mapping ratio, wherein the fiber optic coupler comprises at least some lighting elements have expanding cross-sections;
generating the foveal display region from the foveal data according to the 1:n mapping ratio; and
generating the outer display region from the outer data according to the 1:m mapping ratio, where m is greater than n,
wherein the number of pixels of the image is represented by the equation $$D_{pix} = \frac{\theta_1}{\alpha} + \frac{(\theta_r - \theta_1)}{M \cdot \alpha}$$

where $\theta_1$ equals an angular size of the foveal display region $\theta_r$ equals an angular size of a total field of view, $\alpha$ equals an angular resolution of the foveal display region, and M equals a magnification between the foveal display region and the outer display region.

12. The method of claim 11, generating the foveal display region comprises generating the foveal display region using a fiber optic coupler that transmits light according to the 1:n mapping ratio, and generating the outer display region comprises generating the outer display region using a fiber optic coupler that transmits light according to the 1:m mapping ratio.

13. The method of claim 11, generating the outer display region comprises generating the outer display region substantially surrounding the foveal display region.

14. The method of claim 11, generating the foveal display region comprises generating the foveal display region having four sides, and generating the outer display region comprises generating the outer display region comprising four sub-regions that are each contiguous with a side of the four sides.

15. The method of claim 11, further comprising:
maintaining the image at a substantially fixed position relative to the user using a head-mounted display.

16. The method of claim 15, maintaining the image at the substantially fixed position comprises maintaining the image at a horizontal field-of-view in the range of 30 degrees to 60 degrees and a vertical field-of-view in the range of 20 degrees to 50 degrees relative to the user.

17. The method of claim 11, generating the outer display region from the outer data according to the 1:m mapping ratio, where m is greater than n by a magnification factor in the range of 2:1 to 6:1.

18. The method of claim 11, generating the foveal display region comprises generating the foveal display region having a field-of-view that is in the range of 30 percent to 50 percent of the field-of-view of the outer display region.

19. The method of claim 11, processing the one or more signals comprises processing a first subset of a plurality of signals from a plurality of cameras to yield the foveal data, and processing a second subset of the plurality of the signals to yield the outer data.

20. The imaging system of claim 11, processing the one or more signals comprises processing a signal from a camera to yield the foveal data and the outer data.

* * * * *